United States Patent [19]

Moss

[11] 4,177,696
[45] Dec. 11, 1979

[54] ANGULAR INDEXING MECHANISM FOR ORIENTING WORKPIECE

[75] Inventor: Lester I. Moss, Hackensack, N.J.

[73] Assignee: Mosstype Corporation, Waldwick, N.J.

[21] Appl. No.: 651,535

[22] Filed: Jan. 22, 1976

[51] Int. Cl.² ............................................. B23Q 17/18
[52] U.S. Cl. ..................................... 74/826; 74/813 C
[58] Field of Search ................. 74/826, 813 C, 813 L, 74/815

[56] References Cited

U.S. PATENT DOCUMENTS

| | | | |
|---|---|---|---|
| 3,552,242 | 1/1971 | Morgan, Jr. et al. | 74/826 x |
| 3,653,282 | 4/1972 | Bouffiou et al. | 74/815 |
| 3,717,912 | 2/1973 | Lahm | 74/826 X |
| 3,718,055 | 2/1973 | Maier | 74/826 |
| 3,795,155 | 3/1974 | Price et al. | 74/826 |

Primary Examiner—Lance Chandler
Attorney, Agent, or Firm—Michael Ebert

[57] ABSTRACT

An indexing mechanism in which a workpiece to be machined by a tool is attachable to the end of a rotatable spindle that is driven by the reversible motor of a servomechanism to assume a desired angular position. Mounted on the spindle and rotatable therewith is one gear of a multiple-tooth face gear coupling pair, the second gear of which is axially advanced by a motor along the spindle into and out of meshing engagement with the first gear. The second gear is non-rotatable and acts, when in mesh with the first gear, to prevent rotation of the spindle and thereby lock the angular position of the workpiece. In order to effect precise indexing, a sensor is provided to detect the point at which the second gear is slightly shy of full intermesh with the first gear, the sensor generating a signal which is applied to the servomechanism for the spindle to initiate a multicycle jiggling action in each cycle of which the drive motor is momentarily reversed in direction to slightly turn the first gear and to permit the second gear to effect an incremental advance, the number of cycles being sufficient to bring about full intermesh of the coupling pair.

10 Claims, 8 Drawing Figures

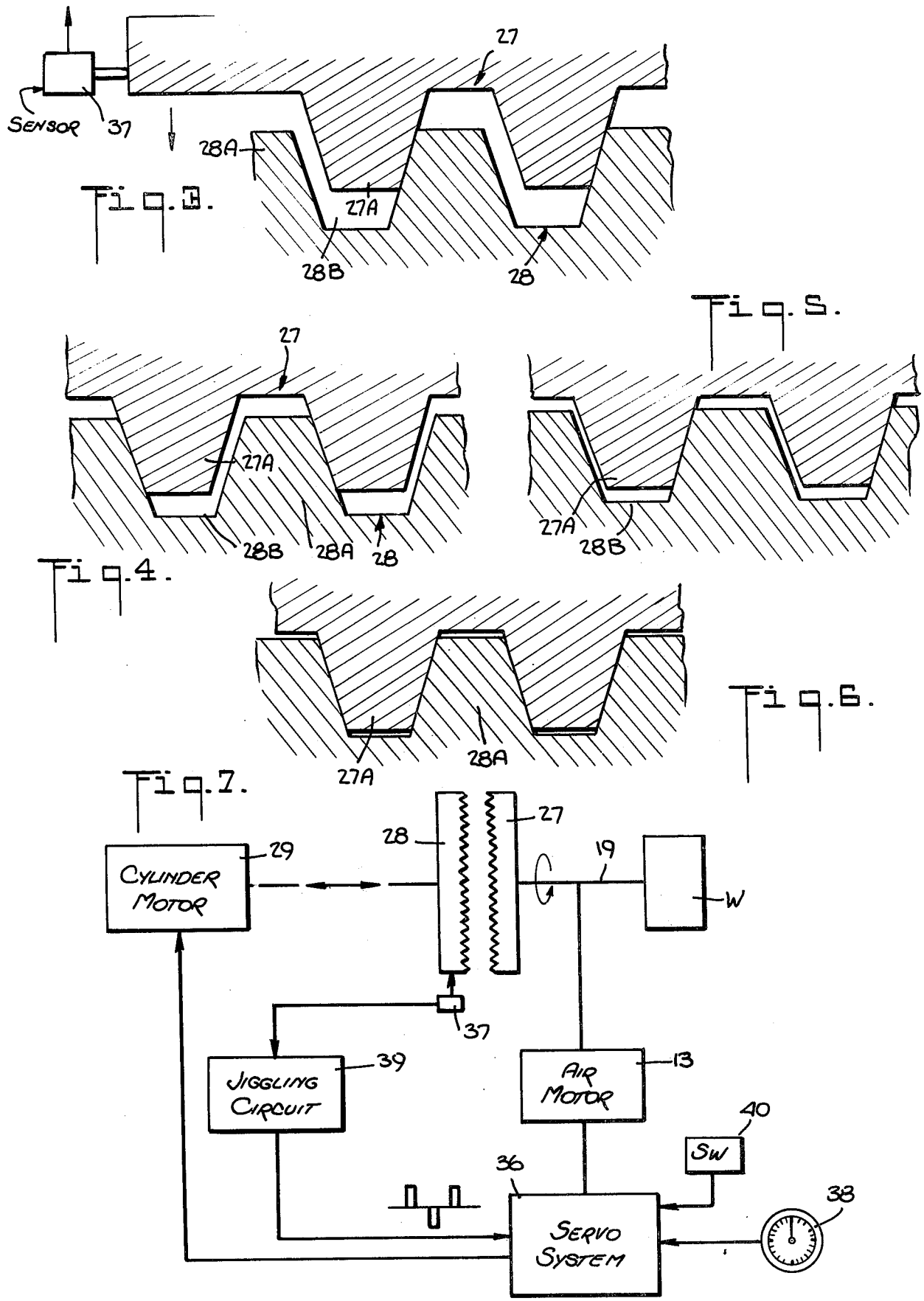

ANGULAR INDEXING MECHANISM FOR ORIENTING WORKPIECE

BACKGROUND OF INVENTION

This invention relates generally to an indexing mechanism for angularly displacing a workpiece with respect to a machine tool, and more particularly to a mechanism in which accurate indexing is effected by a pair of intercoupled face gears which are brought into perfect mesh by a jiggling action.

During certain manufacturing procedures, it is often necessary to carry out a series of sequential machining operations on various portions of a workpiece. To this end, a mechanism must be provided capable of accurately indexing the workpiece relative to the manufacturing tool.

In a typical indexing mechanism, the workpiece must be axially displaced as it is shifted from one angular position to another. Although the axial movement required for this purpose is quite small, the indexing mechanism must impress an axial restraining force on the workpiece during the machining operation. As a consequence, known forms of indexing mechanisms are somewhat inaccurate as well as being limited in their ability to support the weight of the workpiece. Also, such mechanisms impose limits on the cutting forces which can be applied to the workpiece.

The improved indexing mechanism disclosed in the Price et al. U.S. Pat. No. 3,795,155 (1974) possesses the important advantage of effecting indexing without any axial displacement of the workpiece, thereby obviating the drawbacks inherent in earlier forms of indexing mechanisms and affording a higher order of accuracy.

In the indexing mechanism described in the Price et al. patent, whose entire disclosure is incorporated herein by reference, the workpiece is attachable to the end of a spindle on which is mounted one gear of a coupled pair of face gears, the spindle being rotated by a reversible, electronically-controlled, air motor through a worm and worm gear. Rotation of the spindle causes both the workpiece and the first gear to rotate. The second gear of the pair is axially movable along the spindle but is not rotatable, this gear being shiftable with respect to the first gear.

After the spindle carrying the workpiece has been rotated by the air motor to cause the first gear to assume the same angular position, the second gear is axially shifted until it intermeshes with the first gear which is thereby radially locked in place.

According to the Price et al. patent, the indexing accuracy of the mechanism is a function only of the grinding accuracy of the opposed transverse surfaces of the coupling gears. We have found, however, that because of restrictions inherent in the drive system, the face gears in an arrangement of the type disclosed in the Price et al. patent will not seat exactly, and the indexing is therefore inaccurate.

A fundamental requirement to achieve indexing accuracy within the limits imposed by the precision of the face gears is that the face gears be pressed together axially with complete freedom. This freedom permits the gears to seek their own rotational position as determined solely by the precision-ground teeth. Face gears are currently being manufactured to provide indexing within plus or minus 2 seconds of arc. The full and exact achievement of this high degree of precision is a desideratum of the indexing mechanism.

Any and all rotational forces which inhibit the complete freedom of the face gears to seek a condition of exact mesh will detract from the precision of the indexing. There are three main sources of restriction which militate against the attainment of exact mesh. The first source is the restriction introduced by the drive and positioning mechanism. The second source is the friction of the main spindle bearings. The third source is the eccentric loading on the spindle by the workpiece and its fixture.

The nature of the second and third sources is self-explanatory. However, further analysis of the first source of restriction may be helpful toward an understanding of why in the Price et al. arrangement, a condition of exact mesh is not attainable.

The positioning servo system disclosed in the Price et al. patent which functions to bring the rotatable spindle to the required angle is accurate to within approximately 360 seconds of arc (i.e., 0.1 degree). This is sufficiently accurate to allow the face gears to begin their engagement into proper mesh, but it does leave a positional error of the shaft to be corrected by the face gears.

Since the face gear pair, once fully and exactly in mesh, is able to achieve an accuracy for each angular position within 2 seconds of arc or less, it then becomes necessary for the face gears to back drive the positioning servo mechanism in order to achieve a perfect mesh. For example, if the servo mechanism acts to position the worm and worm gear driving the spindle so that the rotating face gear comes to rest at, say, 100 seconds of arc displaced from the true position, and the cylinder pistons, then proceed to axially advance the non-rotating face gear into engagement with the rotating face gear, the rotating face gear and the shaft are then called upon to rotate 98 seconds to permit the face gears to achieve their correct alignment.

However, such rotation is not possible with the worm and worm gear drive disclosed by the Price et al. patent, for such gears are self-locking and cannot be reverse-driven by the shaft. With other drive arrangements, it is possible to avoid a self-locking action and thereby afford some degree of freedom to reverse-drive the mechanism, but whatever known type of drive system is employed, restrictions inevitably will be imposed to prevent the attainment of a state of perfect mesh.

In summary, regardless of how accurately one grinds the opposed face gear surfaces of the coupling pair, the indexing mechanism of the type disclosed in the Price et al. patent will nevertheless be lacking in indexing precision, in that the gears of the pair cannot be brought into perfect mesh.

SUMMARY OF INVENTION

In view of the foregoing, it is the main object of this invention to provide a highly accurate indexing mechanism for shifting the angular position of a workpiece relative to a tool.

More particularly, an object of this invention is to provide an indexing mechanism in which the workpiece is attachable to the end of a spindle which is rotated by the motor of a servo mechanism to cause the workpiece to assume an angular position which is close to a desired true position, the true position being attained by means of an intercoupled pair of face gears, one of which is mounted on the spindle and is rotatable therewith, the other being non-rotatable and being axially movable along the spindle to engage and intermesh perfectly with the first gear and to lock the adjusted position of the workpiece.

Also an object of the invention is to provide a reliable, efficient and precise indexing mechanism which is simple to operate.

The salient feature of the invention resides in a technique to bring about perfect meshing of the coupled face gears, this being accomplished by sensing a point at which the locking gear is slightly shy of full intermesh with the indexing gear to produce a signal which initiates a series of jiggling actions causing the locking gear to home into place.

Briefly stated, these objects are accomplished in an indexing mechanism in which a workpiece to be machined by a tool is attachable to the end of a rotatable spindle that is turned by the reversible motor of a servomechanism to assume an angular position which is close to a desired true position.

Mounted on the spindle and rotatable therewith is one half of a multiple-tooth face gear coupling pair, hereinafter referred to as the indexing gear. The second half of the pair, hereinafter referred to as the locking gear, is non-rotatable and is axially shiftable along the spindle by means of the pistons of short-stroke fluid cylinders into and out of meshing engagement with the indexing gear. The locking gear, when in mesh with the indexing gear, serves to prevent rotation of the spindle and thereby to maintain the angular position of the workpiece.

In order to bring about precise indexing, it is essential that the face gear coupling pair be in perfect mesh, with the teeth of the locking gear properly seated within the gaps of the indexing gear. To this end, a proximity sensor is provided to detect the state in which the locking gear is slightly shy of full intermesh and is restrained from further axial advance by the indexing gear. The sensor generates a signal which is applied to the servomechanism to initiate a jiggling action in each cycle of which the drive motor for the spindle is momentarily reversed in direction to slightly turn the indexing gear and thereby permit the locking gear to axially advance incrementally, the number of cycles being sufficient to bring about an axial advance of the locking gear to properly seat the gear teeth thereof.

This jiggling action overcomes all of the restrictions heretofore encountered with an indexing mechanism making use of a coupled pair of face gears, for with this action an axial force is continuously applied to the locking gear while the indexing gear is at the same time rotated by its drive train back and forth between restraints. During these reciprocating excursions, the restraints are removed from the locking gear which is allowed to freely advance axially until the locking gear reaches a state of perfect mesh with the indexing gear to establish the true indexing position within plus or minus 2 seconds, or whatever other tolerance is provided in precision grinding of the gears.

OUTLINE OF DRAWINGS

For a better understanding of the invention as well as other objects and further features thereof, reference is made to the following detailed description to be read in conjunction with the accompanying drawings, wherein:

FIG. 3 is a sketch showing the relationship between the two face gears of the coupling pair at the instant a jiggling action is initiated;

FIG. 4 shows the relationship of the gears at the end of a first jiggling cycle;

FIG. 5 shows the gear relationship at the end of the second jiggling cycle;

FIG. 6 illustrates the gear relationship at the end of the third and final jiggling cycle;

FIG. 7 is a simplified block diagram of the servo mechanism for controlling the position of the gears and for effecting the jiggling action; and FIG. 8 is a more detailed block diagram of the servo mechanism.

DESCRIPTION OF INVENTION

The Indexing Mechanism

Figure 1:
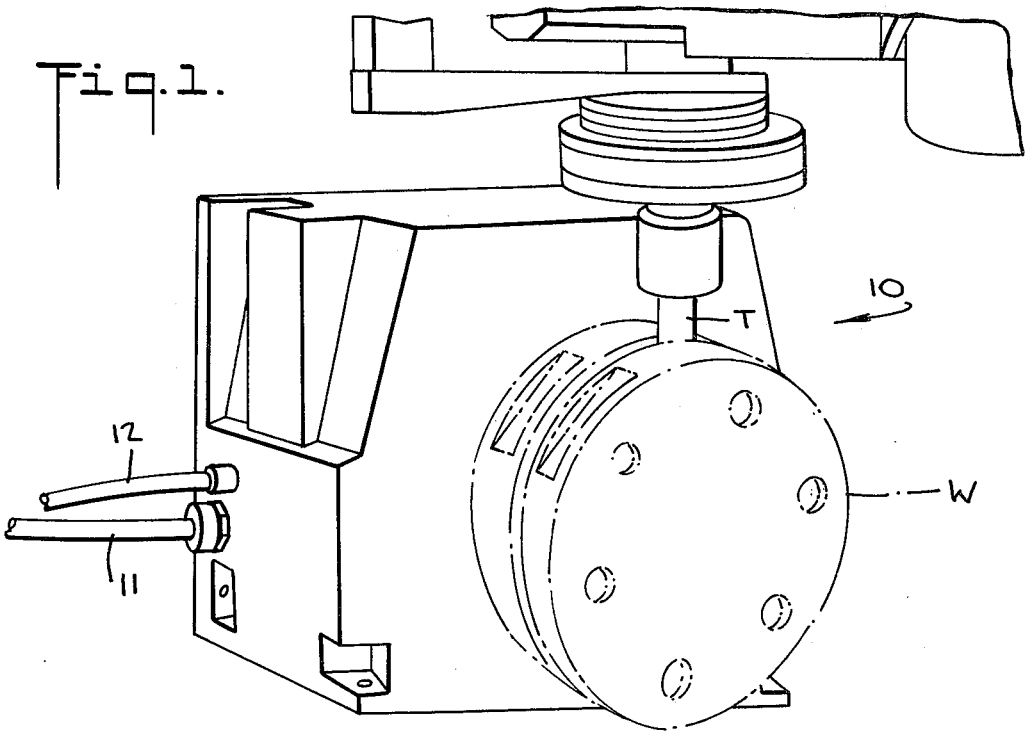
FIG. 1 is a perspective view of an indexing mechanism which incorporates a face gear coupling pair and jiggling means therefor in accordance with the invention.

In an indexing mechanism 10 which includes means to effect a jiggling action in accordance with the invention, the arrangement, as shown in FIG. 1, is such that a workpiece W is attachable to the end of a spindle. Positioned above the workpiece is a rotating machine tool T for performing metal cutting operations at selected points on the workpiece. The nature of the tool and the actions performed thereby form no part of the present invention. Nor is the invention limited to any particular form of workpiece.

Inasmuch as the indexing mechanism includes fluid or pneumatic motors for driving the gears of a coupling pair which require pressurized air, and the drive motor for the indexing gear of the coupling pair is included in an electronically-controlled servomechanism which also governs the operation of the fluid motor for the locking gear, fluid power for the indexing mechanism is supplied by a conduit 11 and electrical power by a conduit or cable 12.

Figure 2:
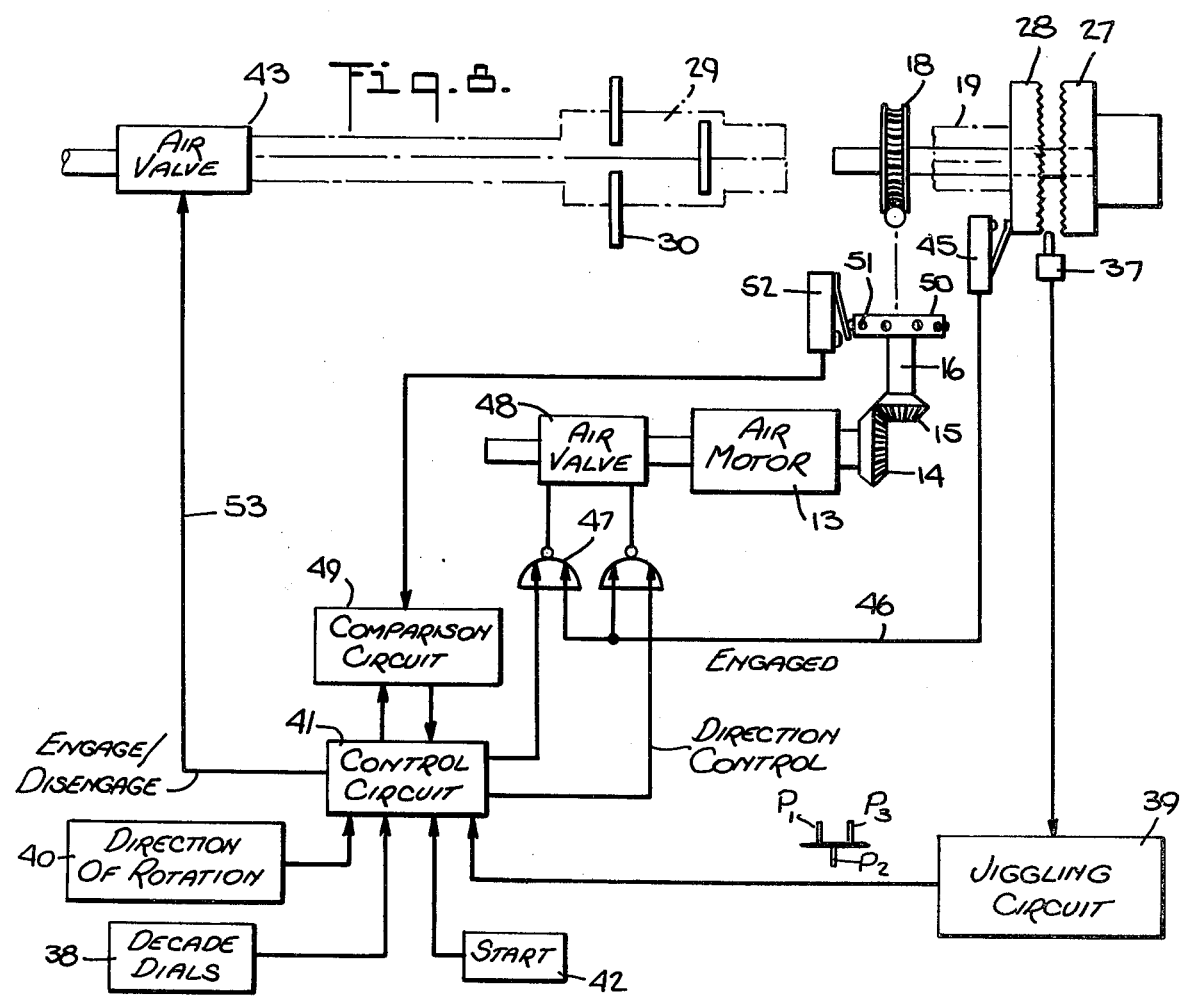
FIG. 2 is an exploded perspective view of the major components of the indexing mechanism.
Figure 2:
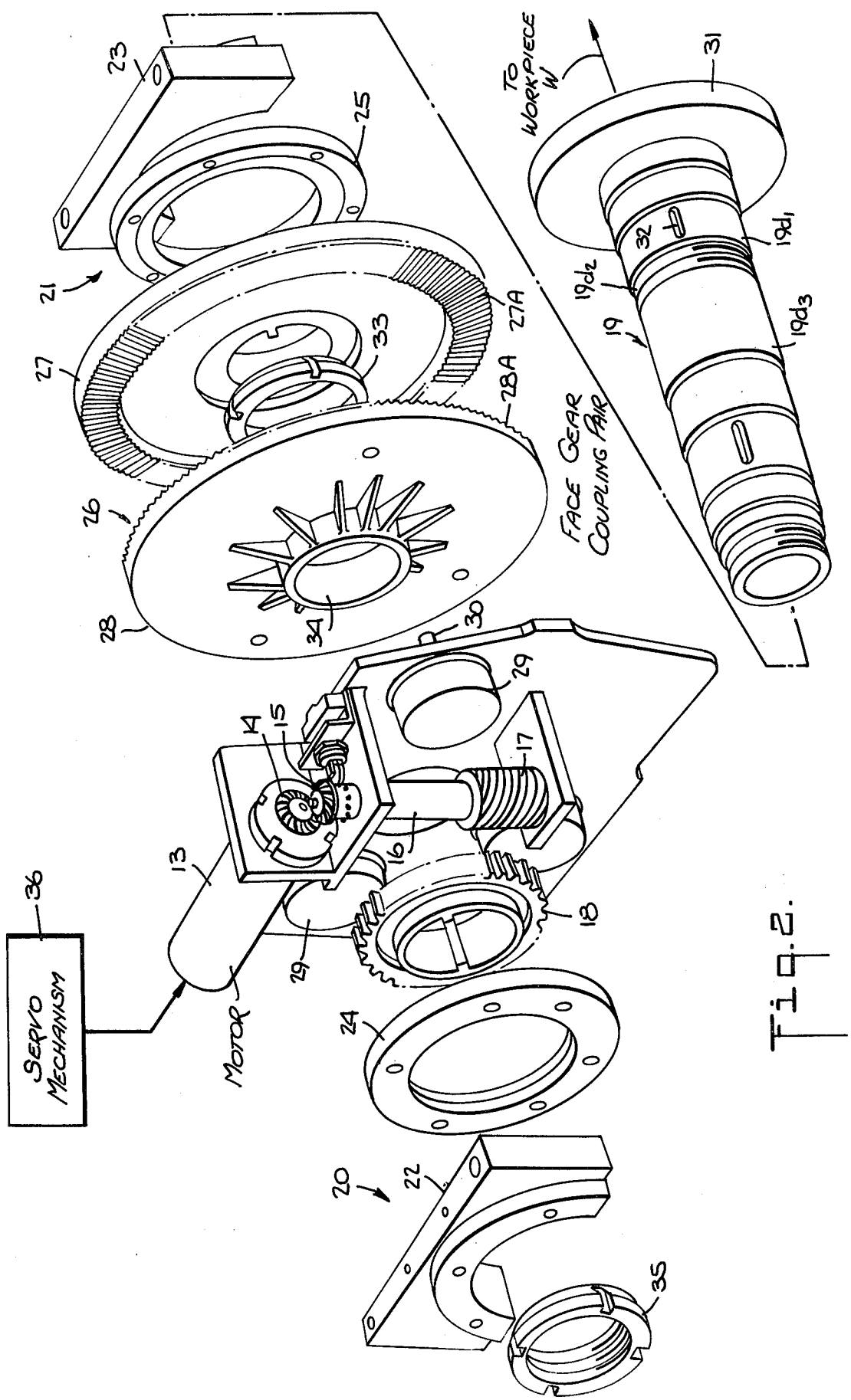

Referring now to FIG. 2, the indexing mechanism includes a fluid motor 13 which forms part of a servomechanism to be later described, motor 13 driving a bevel gear 14 fixed to the output shaft thereof. Gear 14 engages a second bevel gear 15 at right angles thereto, gear 15 being secured to a shaft 16 supporting a worm 17. Worm 17 intermeshes with a ring gear 18 encircling a spindle 19 and affixed thereto.

Spindle 19 is journalled at its opposite ends by bearing assemblies 20 and 21 which are secured to the housing of the mechanism by bearing caps 22 and 23 and clamp rings 24 and 25 which retain the assemblies.

A face gear coupling pair 26 is provided consisting of an indexing gear 27 secured to spindle 19 and rotating therewith, and a locking gear 28 which is non-rotatable and is restricted in its movement to an axial shift over a relatively short distance along spindle 19 into and out of engagement with the indexing gear.

Gears 27 and 28 of the coupling pair are provided with opposed teeth 27A and 28A formed on the confronting faces of the gears. These teeth are adapted to intermesh when locking gear 28 is brought into engagement with indexing gear 27. The axial movement of the locking gear is carried out by a set of three short-stroke fluid cylinders 29 whose respective piston rods 30 are connected to the flat face of gear 28 in order to provide axial movement in both directions.

One end of spindle 19 terminates in a flange 31 to which workpiece W is attachable. Spindle 19 is formed with a series of progressively decreasing diameters. Diameter $19d_1$ on the spindle has keyseats 32 therein that cooperate with keys in indexing gear 27 in order to secure this gear to the spindle. Thus rotation of the spindle by motor 13 results in rotation of the workpiece and of the indexing gear. A threaded portion $19d_2$ of spindle 19 has a locknut 33 mounted thereon so as to retain gear 27 and bearing assembly 21.

Locking gear 28 is provided with a cylindrical hub 34 adapted to slide axially on diameter $19d_3$ of the spindle. Locknut 35 serves to preload bearings 20 and 21 to secure the spindle against axial forces during use.

Motor 13, which drives the spindle, is incorporated in a position servomechanism 36 which causes the spindle to assume a selected angular position in accordance with one or more input signals, as will later be explained, thereby causing workpiece W and indexing gear 27 to assume the same angular position. Before motor 13 is operated, locking gear 28 is retracted from indexing gear 27 by fluid cylinders 29 to permit rotational movement thereof, and after indexing gear 27 is positioned, fluid cylinders then act to advance locking gear 28 into engagement with indexing gear 27 to maintain the angular position of the workpiece.

As explained previously, locking gear 28 will normally not fully intermesh with indexing gear 27 and precise indexing will therefore not be effected. The reason for this lack of full intermesh and the reason why the jiggling action in accordance with the invention brings about full intermesh will not be set forth in conjunction with FIGS. 3, 4, 5, and 6.

The Jiggling Action

Referring now to FIG. 3, there is shown the relationship between locking gear 27 and indexing gear 28 in a condition wherein teeth 27A of gear 27 are advancing into the gaps 28B between teeth 28A of gear 28. However, due to a slight misalignment between the two face gears because of an eccentric load imposed by the workpiece on gear 28 or because of other restrictive factors previously mentioned, teeth 27A, instead of fully advancing into gaps 28B, abut the sloping right walls of teeth 28A and are restrained thereby. Thus no further advance of gear 27 is possible and its teeth 27A are not properly seated in the gaps of gear 28.

We shall assume that the state shown in FIG. 3 comes into being when teeth 27A of gear 27 are displaced 0.004" short of full mesh. This state is detected by a sensor 37 which is activated by the outer edge of advancing gear 27 when the displacement reaches 0.004". Activation of sensor 37 initiates a jiggling action, in the course of which indexing gear 28 is oscillated back and forth within a small arc to permit incremental axial advance of gear 27 and proper seating thereof.

Thus in the first cycle of oscillation, as illustrated in FIG. 4, gear 28 swings clockwise to rotate teeth 27A from the right side walls of teeth 28A and to permit an incremental axial advance of gear 27 until it strikes the left side walls of teeth 28A, again restraining further axial advance, but at a distance closer to the bed of the gaps of teeth 28A.

In the next cycle, as shown in FIG. 5, the direction of swing of gear 28 is reversed, and as teeth 28A of gear 28 move in the counterclockwise direction to rotate teeth 27A from the left side walls of teeth 28A, a further incremental axial advance of gear 27 takes place until this time teeth 27A strike the right side walls of teeth 28A, but at a distance still closer to the bed of the gaps of teeth 28A.

Finally in the third cycle, as shown in FIG. 6, the swing of gear 28 is again reversed, and as teeth 28A move in the clockwise direction, a further incremental axial advance of teeth 27A is permitted. However, this time gear teeth 27A reach a final position in which both flanks of the teeth are in full contact, so that the two face gears are now perfectly intermeshed. Thus each time gear 28 is caused to swing, locking gear 27 is caused to move closer to home until a condition of full intermesh is attained.

While there has been illustrated a jiggling action composed of three oscillatory actions, it will be appreciated that a greater or smaller number of actions may be used to satisfy particular requirements. In practice, the number of jiggling oscillations need not be predetermined, but the jiggling action can be continued until the locking gear reaches a known gauge position which can be sensed by conventional means to produce a signal arresting the jiggling action.

The Servo System

The servo system for postioning the gears of the face gear coupling pair and for effecting the required jiggling action to bring about a full mesh condition is shown in simplified form in FIG. 7.

It will be seen that workpiece W is attached to one end of spindle 19, to which is keyed indexing gear 27, spindle 19 being turned by drive motor 13. Locking gear 28 is shifted axially into and out of engagement with indexing gear 27 by means of cylinder 29 or other suitable motor. The action of motors 13 and 29 are governed by servo mechanism 36 which is set by a manually-operated dial or dials 38, the dial setting determining the desired angle to be assumed by spindle 19. The direction of rotation is controlled by a switch 40 whose setting determines the direction of rotation.

Let us assume that dial 38 is set to 36 degrees in order to cause the servo system to index the workpiece so that it assumes the same angular position. When servo mechanism 36 is activated, it first commands motor 29 to retract locking gear 28, so that spindle 19 carrying indexing gear 27 is then free to turn. When the locking gear is fully retracted, this fact is sensed to initiate the operation of motor 13 which then turns in a direction determined by switch 40 until spindle 19 is at its 36° position, at which point drive motor 13 is arrested.

The cylinder 29 is again actuated to cause locking gear 28 to advance on the spindle toward indexing gear 27, which is at 36°, the advance continuing until gear 27 is slightly shy of full intermesh with gear 28, as detected by sensor 37. The resultant signal from the sensor activates a jiggling circuit 39, which generates a series of three equispaced pulses $P_1$, $P_2$, and $P_3$, pulse $P_2$ being of reverse polarity relative to pulses $P_1$ and $P_3$.

These pulses are applied to servo mechanism 36 to cause drive motor 13, in response thereto, to first turn spindle 19 in one direction, say, for 15 milliseconds; then to pause for, say, 100 milliseconds; then to again drive spindle 19 but in the reverse direction for 15 milliseconds; then to again pause for 100 milliseconds, and then again turn spindle 19 in the first direction. With each jiggling action, motor 29 advances gear 28 axially still closer to full intermesh until a condition of full intermesh is attained, at which point the indexing gear is locked by locking gear 28 at its set angular position.

It will be appreciated that the number of jiggling actions and the timing thereof are not limited to the above example, and that in practice a greater number of actions with a different timing pattern may be used.

A preferred embodiment of a suitable servo system is shown in FIG. 8, where it will be seen that dials 38 for setting the angular position of workpiece W are coupled to the control circuit 41 of the servo system, the dials preferably being in the form of externally-located, thumbwheel decade switch dials. Also coupled to control circuit 41 is the direction-of-rotation switch 40 and a start button 42.

When the start button is pressed, the signal from direction-of-rotation switch 40 is sent by control circuit 41 to an air valve 43, which then acts to feed pressurized air from a suitable source to air cylinders 29 for operating pistons 30 coupled to locking gear 28, thereby causing locking gear 28 to shift axially along spindle 19 in a direction effecting retraction from the rotatable indexing gear 27.

When indexing gear 28 is properly retracted, it strikes a switch 45 which arrests the engaged signal on a line 46 through a NOR gate 47 connected to an air valve 48, thereby causing air motor 13 to rotate in the controlled direction.

The angle of rotation set on dials 38 is encoded by control circuit 41 and sent to a comparison circuit 49. As the output shaft of air motor 13 turns, it drives spindle 19 through the bevel gears 14 and 15 and the worm gear set 17, 18. Mounted on shaft 16, which is driven by bevel gear 15, is a ring 50 having nine radially-extending pins 51 that engage and actuate a switch 52 as they rotate thereby. The gear ratio of the bevel gears is such that shaft 16 turns forty times with each complete revolution of the output shaft of air motor 13. Because there are nine projecting pins 51 that engage switch 52 for each revolution of shaft 16, 360 pulses will be produced for each complete revolution of the output shaft of drive motor 13. The decade dials 38 can therefore be indexed in one-degree increments. Pulses from switch 52 are also supplied to comparison circuit 49.

When comparison circuit 49 detects no difference between the angle set in dials 38 and the angular displacement of the output shaft of air motor 13, it sends a signal to control circuit 41, which reverses air valve 48, thereby reversing air motor 13. It also sends an engage signal to air valve 43 on line 53, causing air-operated cylinders 29 to shift locking gear 28 toward meshing engagement with indexing gear 27. As locking gear 28 moves axially away from switch 45, an engage signal is sent on line 46 to air valve 48, causing air motor 13 to stop. This action ensures that air motor 13 will not operate to turn the indexing gear as long as locking gear 28 is axially displaced from its fully retracted endmost position.

The servo system arrangement thus far described is essentially the same as the system disclosed in U.S. Pat. No. 3,795,155. However, in the present invention, when locking gear 28 is intercepted by sensor switch 37 at a point just shy of full intermesh, a signal is sent to the jiggling action circuit 39 which may be a logic circuit adapted, in response to the sensor signal, to generate the train of three pulses $P_1$, $P_2$ and $P_3$. The pulses are applied to control circuit 41 to re-activate the servo system, and to cause air motor 13 to oscillate to cause spindle 19 to undergo a jiggling action while the locking gear 28 is being advanced toward indexing gear 27 to bring about a condition of full intermesh.

While there has been shown and described a preferred embodiment of an angular indexing mechanism for orienting a workpiece in accordance with the invention and to effect jiggling to bring about a condition of full intermesh of the face gear pair, it will be appreciated that many changes and modifications may be made therein without, however, departing from the essential spirit thereof. For example, instead of pneumatically-operated motors or cylinders 13 and 43 as shown, the servo system may be entirely electronic in nature, electronic relays being used in place of the air valves shown in FIG. 8.

I claim:

1. In a mechanism provided with a multiple-tooth face gear coupling pair wherein the first gear in the pair is arranged to be rotatable and the second gear to be non-rotatable, reversible motor means being associated with said first gear to cause it to assume a desired angular position, the second gear being axially retractable and advanceable with respect to the first gear whereby when the second gear is retracted, the first gear is free to rotate, and when the second gear is advanced into meshing relationship with the first gear, the position of the first gear is locked against rotation, a system for bringing about a condition of full intermeshing engagement between the face gears, said system comprising:
   (A) means operatively coupled to said second gear to sense a point in the advance thereof at which the second gear is a few mils somewhat shy of full engagement with the first gear to produce a control signal; and
   (B) means responsive to said control signal to initiate a jiggling action in each phase of which the motor means for the first gear is momentarily reversed in direction to slightly turn the first gear to permit an incremental advance of the second gear to a point still closer to full engagement, said jiggling action continuing until a condition of full engagement is attained.

2. A mechanism as set forth in claim 1, wherein said first gear is mounted for rotation on a spindle and said second non-rotatable gear is axially shiftable along said spindle toward and away from said first gear.

3. In an indexing mechanism for angularly positioning a workpiece relative to a tool, the combination comprising:
   (A) a multiple-tooth face gear coupling pair, one gear functioning as an indexing gear and the other gear as a locking gear;
   (B) a rotatable spindle to which the workpiece is attachable for positioning, said indexing gear being mounted on said spindle and being rotated thereby, said locking gear being axially shiftable on said spindle into and out of meshing engagement with said indexing gear, whereby said spindle is free to turn when said locking gear is retracted and is held at its set angular position when said locking gear is in mesh with said indexing gear;
   (C) a motor having a piston coupled to said locking gear to advance said locking gear axially toward or away from said indexing gear;
   (D) a drive motor operatively coupled to said spindle to rotate said indexing gear; and
   (E) a servo system coupled to said motors, said system having a dial which is settable to a desired angular position, and means responsive to the dial-setting, sequentially to cause said piston motor to retract said locking gear to free said spindle, after which said drive motor operates to turn said spindle to an angular position corresponding to said setting, and said piston motor then advances said locking gear into engagement with said indexing gear to a control point at which the locking gear and the indexing gear are in side-wall abutting relationship which inhibits a further advance of said locking gear; and (F) means associated with said servo system and activated when said control point is reached to initiate a jiggling action in which the drive motor is momentarily reversed in direction to slightly turn the indexing gear to permit the piston motor to advance said locking gear to a point still closer to full engagement with the indexing gear, said jiggling action continuing until a condition of full intermesh is attained.

4. The combination as set forth in claim 1, wherein said jiggling action takes place at least three times.

5. The combination as set forth in claim 1, wherein said motors are reversible pneumatic motors energized by pressurized air.

6. The combination as set forth in claim 1, wherein said motors are reversible electrical motors.

7. The combination as set forth in claim 1, wherein said control point is sensed by a switch which is actuated when said locking gear reaches said point.

8. The combination as set forth in claim 1, wherein said gears are constituted by a pair of discs positioned in planes substantially perpendicular to the longitudinal axis of the spindle, said discs having a plurality of radially extending teeth formed on the confronting faces thereof.

9. The combination as set forth in claim 1, wherein said drive motor is an air motor whose output shaft is coupled to said spindle by a gear train.

10. A mechanism as set forth in claim 1, wherein said few mils is about 4 mils.

* * * * *